United States Patent [19]

Wirt

[11] 4,077,445
[45] Mar. 7, 1978

[54] HYDRAULIC CIRCUIT FOR TREE HARVESTER

[75] Inventor: Leon A. Wirt, Joliet, Ill.

[73] Assignee: Caterpillar Tractor Co., Peoria, Ill.

[21] Appl. No.: 673,186

[22] Filed: Apr. 2, 1976

[51] Int. Cl.$^2$ ............................................. A01G 23/08
[52] U.S. Cl. .................................... 144/3 D; 91/412; 91/413; 91/448; 144/309 AC
[58] Field of Search ..................... 144/2 Z, 3 D, 34 R, 144/34 E, 309 AC; 91/412, 413, 414, 448

[56] References Cited

U.S. PATENT DOCUMENTS

| | | | |
|---|---|---|---|
| 3,910,326 | 10/1975 | Tucek | 144/34 R |
| 3,929,244 | 12/1975 | Ekstrom | 91/412 |
| 3,966,066 | 6/1976 | Schexnayder | 91/412 |
| 3,994,325 | 11/1976 | Cnyder et al. | 144/34 E |

*Primary Examiner*—Othell M. Simpson
*Assistant Examiner*—W. D. Bray
*Attorney, Agent, or Firm*—Wegner, Stellman, McCord, Wiles & Wood

[57] ABSTRACT

In a tree harvesting machine having a shear assembly, a delimbing assembly, a drive mechanism for moving a tree past the delimbing assembly, and a grapple arm for urging the tree into engagement with the drive mechanism and the delimbing assembly, a hydraulic control circuit including a pair of control valves disposed along a main fluid line providing communication between an upstream source of fluid under pressure and a downstream reservoir, one of the valves being selectively operable to divert fluid under pressure upstream to a grapple arm motor and simultaneously provide communication between the grapple arm motor and the line downstream to actuate or retract the grapple arm, and the other of the valves being selectively operable to divert fluid under pressure upstream to a shear motor and simultaneously provide communication between the shear motor and the line downstream to actuate or retract the shear assembly and to divert fluid under pressure upstream to a drive motor to actuate the drive mechanism when the shear assembly is retracted. Preferably, an accumulator is connected to the grapple arm motor to maintain grapple arm pressure and a pressure relief valve is disposed between the source of fluid under pressure and the control valves to assist in properly operating the tree harvesting machine.

10 Claims, 2 Drawing Figures

HYDRAULIC CIRCUIT FOR TREE HARVESTER

BACKGROUND OF THE INVENTION

This invention relates generally to a tree harvesting machine attachable to a vehicle and, more particularly, to a hydraulic circuit for controlling the functions of harvesting machines of the character shown and described in Moser et al. U.S. Pat. No. 3,842,872 entitled "Delimber Assembly For Tree Harvesting Machines" issued Oct. 22, 1974, Moser et al. U.S. Pat. No. 3,731,720 entitled "Shear Assembly For Tree Harvesters" issued May 8, 1973, and Gutman et al. U.S. Pat. No. 3,669,161 entitled "Drive Mechanism For Tree Harvesters" issued June 13, 1972. All of the above are assigned to the assignee of the present invention. A more complete description of the various components, their respective functions and their interrelationship is found therein.

A prior hydraulic control circuit used with a tree harvesting machine is shown in Moser U.S. Pat. No. 3,690,354 entitled "Tree Harvester Control Circuit" issued Sept. 12, 1972, and also assigned to the assignee of the present invention. Therein, a single control valve having two operating positions regulated substantially the entire tree harvesting operation. In addition, the pressures within the grapple arms and the hydraulic drive motor were interdependent so that as the load on the drive motor increased during delimbing, the grapple arm pressure increased to insure that the tree remained effectively engaged with the drive mechanism. Similarly, when the drive motor load decreased, the grapple arm pressure decreased.

SUMMARY OF THE INVENTION

It is the primary object of the present invention to simplify and improve the performance of a tree harvesting machine of the type herein described and shown.

In accordance with the invention, a hydraulic control circuit for a tree harvesting machine includes a first control valve for operating a grapple arm and a second control valve in series along a fluid line with the first control valve for operating the shear assembly and a drive motor. The first control valve diverts pressurized fluid to a hydraulic grapple arm motor and an accumulator thereby rendering the grapple arm operation independent of delimbing or shear hydraulic pressures. Hence, this circuit, unlike most other systems, has the advantage of permitting operation of a grapple arm without the shear assembly closing simultaneously.

As a result, a tree is held within the harvester head with sufficient force which remains substantially constant. By eliminating substantial increases in pressure, there is a lessening of the load placed on the hydraulic drive motor which causes the tree to be moved through the harvester. It may thus be appreciated that less pressure is placed on the drive mechanism chain and, therefore, less frictional drag between the chain and its support. By reducing the drag, drive requirements are reduced thereby decreasing leak generation in the hydraulic motor.

The accumulator maintains proper hydraulic pressure within the grapple arm motor in order to firmly hold a tree within the harvester head as the harvesting process takes place. To prevent the grapple arm from opening or from being cushioned as the load or pressures are changed during processing, a pilot operated check valve is disposed between the accumulator and the grapple arm motor.

The control valves, except for the shear speed valve and the check valves, are removed from the hazardous environment of the harvester head and mounted on the vehicle which carries the harvester head. As a consequence, the weight of the harvester head, which is critical, is reduced.

In order to properly close the grapple arms around a tree so that the tree will be firmly held within the harvester head and yet easily movable therethrough during delimbing regardless of tree size or shape, an adjustable pressure relief valve is operatively connected between the hydraulic pump and the grapple arm motors. Thus, pressurized fluid is delivered to the grapple arm motor until a predetermined pressure is achieved within the motor which corresponds to a correct grapple arm position.

DESCRIPTION OF THE PREFERRED EMBODIMENT

Figure 1:
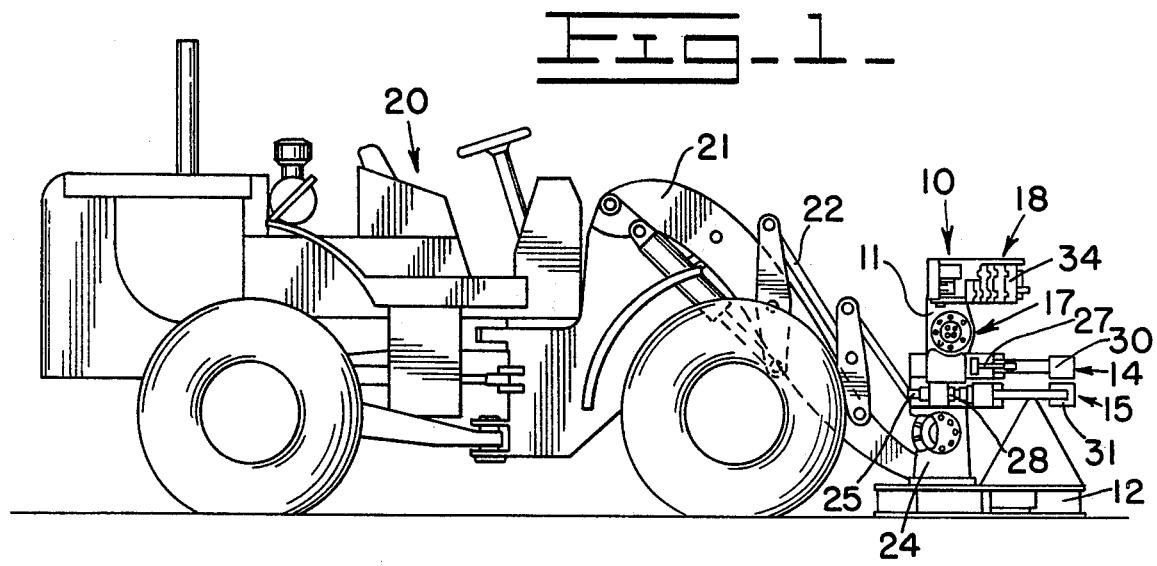
FIG. 1 is a side elevational view of a tree harvesting machine providing a preferred environment for the control circuit of the present invention.

A tree harvesting machine constructed according to the invention includes a harvester head 10 having an elongate frame 11 mounting a shear assembly 12, a pair of grapple arms 14 and 15, a drive mechanism, generally designated 17, and a delimber assembly 18.

The frame 11 is movably mounted on a vehicle 20 of the type commonly adapted for use with a loader bucket and having a pair of lift arms, one of which is designated 21, and a tilt linkage 22. The frame 11 is interconnected with the lift arms 21 and the tilt linkage 22 by pivot connections indicated at 24 and 25, respectively.

The shear assembly 12 is mounted upon the lower end of the frame 11 and includes means for cutting trees placed within the harvester head 10 and severing them from the ground. A double acting hydraulic motor, or jack 26, is operable in extension for closing the shear assembly 12 in cutting through the trunk of a tree placed in the harvester head 10. Retraction of the jack 26 serves to reopen the shear assembly 12. Additional details of the shear assembly of the type utilized herein may be found in U.S. Pat. No. 3,731,720 cited earlier.

The grapple arms 14 and 15 are pivotally supported upon the frame 11 and movable by double acting hydraulic motors, or jacks 27 and 28, respectively, between open and closed position to engage or release a tree to or from the drive mechanism 17. At the end of each of the grapple arms 14 and 15 are arcuate impact shearing blades 30 and 31, respectively, having cutting edges (not numbered) extending generally away from the direction of the movement produced by the drive mechanism to cut off limbs generally facing away from the frame 11. Each of the jacks 27 and 28 are interconnected between the frame 11 and a respective grapple arm.

The drive mechanism 17 is arranged on a midportion of the frame 11 and includes a conventional endless chain tree driving assembly (not shown). A hydraulic rotary drive motor 32 operates the drive mechanism 17.

Additional details of the drive mechanism may be found in U.S. Pat. No. 3,669,161 noted above.

The delimber assembly 18 is mounted upon the upper end of the frame 11. The delimber assembly 18 includes a flexible blade, generally designated 34, composed of pivotally connected chain links having impact cutting edges (not numbered) extending generally away from the direction of tree movement produced by the drive mechanism 17 to cut off limbs generally facing toward the frame 11. A more detailed description may be found in U.S. Pat. No. 3,842,872 referenced previously herein.

The tree harvesting process is commenced by driving the vehicle 20 forwardly so that the harvester head 10, in the upright position as shown in FIG. 1, receives a standing tree within the shear assembly 12, between the grapple arms 14 and 15, against the drive mechanism 17, and within the delimber assembly 18. The grapple arms 14 and 15 are then closed against the tree by extending the grapple arm jacks 27 and 28 so that the tree is maintained within the harvester head 10. The tree is then severed from the ground by extending the shear jack 26 to close the shear assembly 12 along the base of the tree.

To initiate the delimbing process, the top of the harvester head 10 is rotated forwardly and downwardly by the tilt linkage 22 so that the tree is in a generally horizontal position. The shear assembly 12 is opened by retracting the shear jack 26 so that the tree may be urged to move axially within the harvester head 10 toward and through shear assembly 12 by the rotating chain assembly of the drive mechanism 17. When the tree is advanced through the harvester head 10, limbs and other projections are removed by the delimbing assembly 18 in conjunction with the grapple arm blades 30 and 31 as the limbs and projections impact the respective cutting edges. During this phase of operation the grapple arm blades 30 and 31 continue to be urged by the grapple arm jacks 27 and 28 into processing engagement with the circumference of the tree and the grapple arms 14 and 15 continue to urge the tree into proper engagement with the drive mechanism 17 and the flexible blade 34 of the delimber assembly 18.

The grapple arms 14 and 15 remain in closed engagement with the tree during actuation of both of the shear assembly 12 and the drive mechanism 17 to prevent the tree from falling from the harvester head 10. The shear assembly 12 may be actuated during the delimbing process to cut the tree into sections or to remove the top portion of the tree. After processing the tree, the grapple arm jacks 27 and 28 are retracted to open the grapple arms 14 and 15 and release the tree.

After completion of the harvesting process, the harvester head 10 is rotated back to an upright position and the grapple arms 14 and 15 and the shear assembly 12 are placed in an open position in order to readily receive another tree.

Figure 2:
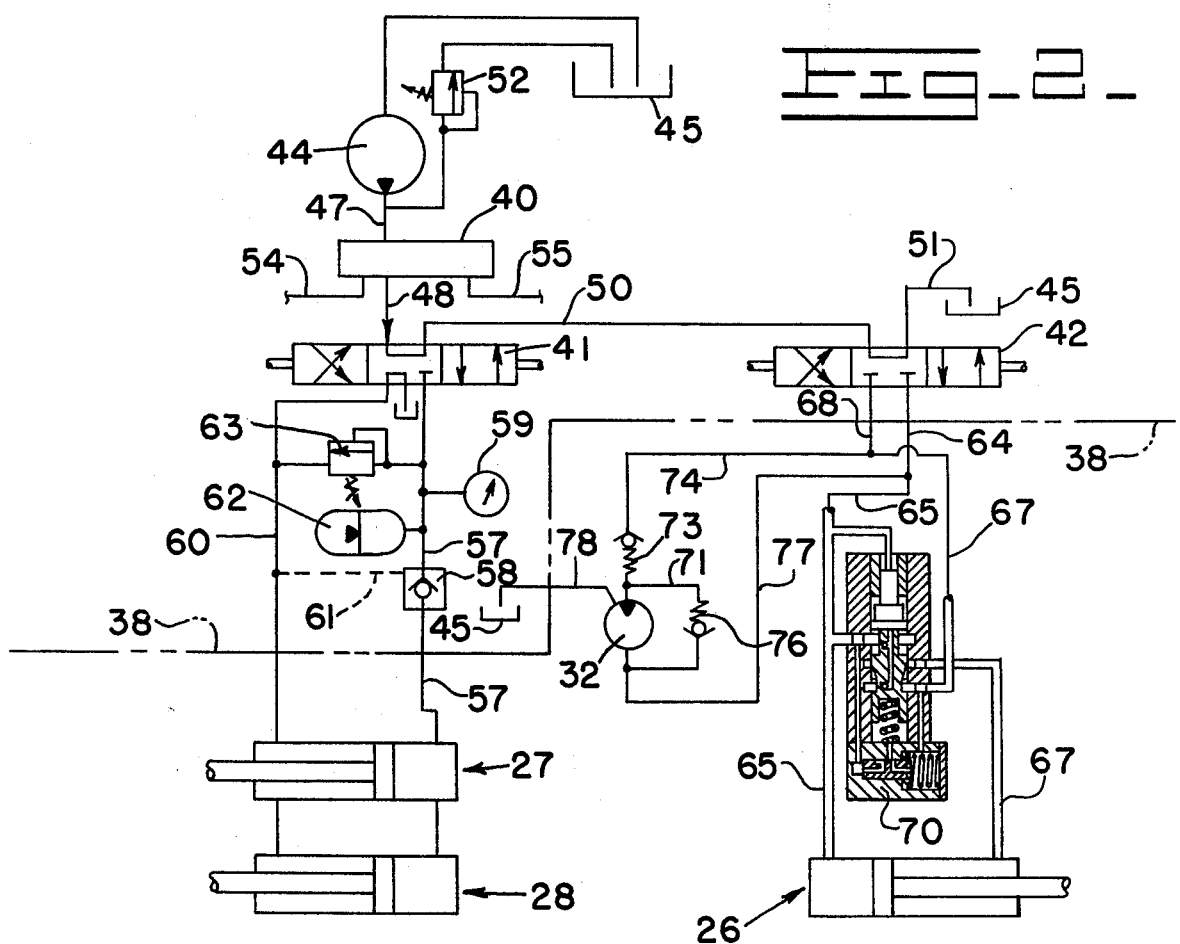
FIG. 2 is a schematic of the control circuit of the present invention particularly adapted for use with the tree harvesting machine shown in FIG. 1.

The hydraulic control circuit of FIG. 2 is particularly adapted to accomplish the various functions of the tree harvesting machine described above. Those components of the hydraulic control circuit which are mounted on the vehicle 20 are shown as lying above the dashed line 38 while those that are mounted on the harvester head 10 are shown as lying below.

The processing of the tree is controlled by an operator through three directional control valves which are carried by the vehicle 20, in addition to those not shown which allow control of the vehicle 20 itself. A control valve 40 allows manipulation of the orientation of the harvester head 10. A control valve 41 permits the actuation and retraction of the grapple arms 14 and 15. A control valve 42 permits actuation and retraction of the shear assembly 12 and operation of the drive mechanism 17. The control valves 40, 41 and 42 are disposed in series along a main fluid line extending between a pump 44 at the upstream end and a reservoir 45 at the downstream end. The pump 44 is connected to the control valve 40 by a line 47 and a line 48 in turn extends from the control valve 40 to the valve 41. A line 50 extends from the valve 41 to the control valve 42 and the latter is returned to the reservoir 45 via a line 51.

The pump 44 is provided with hydraulic fluid by the reservoir 45 and has its output returned thereto via an adjustable relief valve 52. A pressure gauge may be substituted for the relief valve 52 in order to provide for manual control of fluid pressure within the main line.

The control valve 40 is selectively operable to deliver pressurized fluid to a line 54 to operate a conventional mechanism for controlling the orientation of the harvester head 10. It may also be shifted to deliver pressurized fluid to the line 55 to cause conventional means to lift the harvester head 10 and may be moved to a third position to deliver pressurized fluid to the line 48.

The control valve 41 is an open center four-way valve and, in the open position shown in FIG. 2, is operable to deliver pressurized fluid to the line 50, and thus to the control valve 42. The control valve 41 may be shifted to extend or retract the grapple arms 14 and 15 by operation of the jacks 27 or 28.

For example, to engage the grapple arms 14 and 15 with a tree, the control valve 41 may be shifted to the right to divert pressurized fluid from the line 48 to a branch line 57 through a pilot operated check valve 58 to the jacks 27 and 28 to extend the same. At the same time, a branch line 60 will connect the other sides of the jacks 27 and 28 to the line 50, and thus, to the reservoir 45, assuming that the control valve 42 has not been shifted.

Similarly, by shifting the control valve 41 to the left, pressurized fluid will be diverted to the jacks 27 and 28 to retract the same and open the grapple arms 14 and 15. At this time, a pilot line 61 extending from the line 60 to the check valve 58 will cause the check valve 58 to open to permit fluid in the opposite sides of jacks 27 and 28 to be exhausted through line 57 to the reservoir 45 via the line 50.

It will be observed that an accumulator 62 of conventional construction is connected to the line 57 between the control valve 41 and the check valve 58. An adjustable pressure relief valve 63 is connected between lines 57 and 60 to limit the amount of fluid pressure delivered to the accumulator 62 and the jacks 27 and 28. A pressure gauge 59 is also connected to the line 57 to assist in regulating the grapple arm pressure accurately. Consequently, when the control valve 41 is shifted to the right to extend the jacks 27 and 28 and engage the grapple arms 14 and 15 with a tree, pressurized fluid will be admitted to the accumulator 62 to be stored within the same. When the control valve 41 is returned to the position illustrated in Fig. 2, the supply of fluid under pressure within the accumulator 62 will maintain the application of fluid under pressure to the jacks 27 and 28 so that the same may continue to extend and cause the grapple arms 14 and 15 to move inwardly on a tree as trunk diameter narrows or simply to maintain a desired force level of the grapple arms 14 and 15 against the tree. The check valve 58 is active at this time to preclude back flow to the accumulator 62 due to load changes during delimbing thereby preventing undesirable cushioned hydraulic action. Note that one side of the jacks 27 and 28 are vented to the reservoir 45 via the line 60 when the control valve 41 is in its open position.

The control valve 42 is a four-way valve and, in the position shown in FIG. 2, is operable to deliver pressurized fluid to the line 51, and thus to the reservoir 45. The control valve 42 may be shifted to open or close the shear assembly 12 by operation of the jack 26 and to operate the drive mechanism 17 by operation of the hydraulic motor 32.

To close the shear assembly 12 and thereby sever a tree situated therein, the control valve 42 is shifted to the right to divert pressurized fluid from the line 50 through a branch line 64 and a secondary line 65 to the jack 26 to extend the same, provided that both control valves 40 and 41 have not been shifted. Simultaneously, a secondary line 67 will connect the opposite side of the jack 26 to a branch line 68 communicating with the line 51 which leads to the reservoir 45. A two-speed shear valve 70, such as that shown in U.S. Pat. No. 3,690,354, the details of which are herein incorporated by reference, is appropriately interconnected with the lines 65 and 67 to permit the shear assembly 12 to be actuated or closed at relatively high speed until it engages the tree. Thereafter, the valve 70 causes the shear assembly 12 to be closed at reduced speed but with substantially increased force sufficient to sever the tree. Hydraulic fluid is precluded from driving the hydraulic motor 32 by the action of a bypass line 71 and a check valve 73 disposed along a secondary line 74. Their action causes fluid pressure to be equalized at the motor ports while the shear assembly 12 is being closed.

By shifting the control valve 42 to the left, pressurized fluid will be directed via the lines 68 and 67 to the jack 26 to retract the same and open the shear assembly 12. Exhausted hydraulic fluid will be directed to the reservoir 45 through the lines 65, 64 and 51. When the shear assembly 12 is completely reopened, fluid pressure will increase in the lines 67, 68 and 74 to open the check valve 73 and drive the hydraulic motor 32. Pressurized fluid, which is prevented from bypassing the hydraulic motor 32 by the check valve 76 disposed along the bypass line 71, will be returned to the reservoir 45 via a secondary line 77 and the lines 64 and 51. An internal drain line 78 leading to the reservoir 45 is provided for the hydraulic motor 32.

When the hydraulic motor 32 is operated, the tree is moved through the harvester head 10 and is delimbed. The control valve 42 may be intermittently operated during the delimbing process to cut the tree into sections or to sever the unusable top portion.

Hence, the operation of the harvester has been significantly simplified. The operator need only operate one control valve at a time in order to achieve the functions described in detail above for cutting and delimbing a tree.

It can be appreciated that the relief valves 52 and 59 can be used to set the proper operating pressures within the hydraulic circuit and can also be set as required to prevent damage to the various components. It is also noted that the control valves 41 and 42 can be spring-loaded so that they can be released to their open conditions, not shifted, thereby permitting easy alternative operation of the other. Similarly, the control valve 40 can be spring-loaded to normally deliver fluid under pressure downstream along the main fluid line.

I claim:

1. A hydraulic control circuit for use in a tree harvesting machine having a shear assembly operated by double acting hydraulic motor means, a delimbing assembly, a drive mechanism operated by hydraulic motor means for moving a tree past the delimbing assembly, and a grapple arm operated by double acting hydraulic motor means for urging the tree into engagement with the drive mechanism and the delimbing assembly, comprising:

a source of fluid under pressure and a fluid reservoir;

a main fluid line having an upstream end in communication with said source of fluid under pressure and a downstream end in communication with said reservoir;

a first control valve disposed along said main line intermediate said source of fluid under pressure and said reservoir; and a second control valve disposed along said main line intermediate said first valve and said reservoir, said first valve being selectively operable to communicate said main line upstream with said main line downstream to provide communication between said source of fluid under pressure and said second valve, said second valve being selectively operable to communicate said main line upstream with said main line downstream to provide communication between said first valve and said reservoir, one of said valves being further selectively operable to (a) communicate said main line upstream with one side of the grapple arm motor means and simultaneously communicate said main line downstream with the other side of the grapple arm motor means to actuate the grapple arm and (b) communicate said main line upstream with said other side of the grapple arm motor means and simultaneously communicate said main line downstream with said one side of the grapple arm motor means to retract the grapple arm, the other of said valves being further selectively operable to (a) communicate said main line upstream with one side of the shear motor means and simultaneously communicate said main line downstream with the other side of the shear motor means to actuate the shear assembly and (b) communicate said main line upstream with said other side of the shear motor means and a port of the drive motor means and simultaneously communicate said main line downstream with said one side of the shear motor means and another port of the drive motor means to retract the shear assembly and actuate the drive mechanism.

2. The hydraulic control circuit of claim 1 wherein said one valve has three operative conditions, said one valve operated at its first condition providing communication between said main line upstream and downstream, and further including first and second branch lines communicating with said one valve, said first line providing communication with one side of the grapple arm motor means, said second line providing communication with the other side of the grapple arm motor means, said one valve operated at its second condition diverting fluid under pressure in said main line upstream through said first line into said one side of the grapple arm motor means forcing fluid from said other side of the grapple arm motor means through said second line to said main line downstream to actuate the grapple arm, said one valve operated at its third condition diverting fluid under pressure in said main line upstream through said second line into said other side of the grapple arm motor means forcing fluid from one side of the grapple arm motor means through said first line to said main line downstream to retract the grapple arm.

3. The hydraulic control circuit of claim 2 further including an accumulator connected to said first line, said accumulator storing fluid energy to maintain pressure in said one side of the grapple arm motor means when said one valve is operated at its first condition, fluid being forced from said accumulator to said one side of the grapple arm motor means to further actuate the grapple arm when the grapple arm pressure diminishes.

4. The hydraulic control circuit of claim 3 further including a check valve disposed along said first line intermediate said accumulator and said one side of the grapple arm motor means to prevent fluid flow from said one side of the grapple arm motor means, said check valve being opened in response to fluid pressure in said second line to permit fluid flow from said one side of the grapple arm motor means through said first line when said one valve is operated at its third condition.

5. The hydraulic control circuit of claim 1 wherein said other valve has three operative conditions, said other valve operated at its first condition providing communication between said main line upstream and downstream, and further including first and second branch lines communicating with said other valve, said first line providing communication with one side of the shear motor means and with a port of the drive motor means, said second line providing communication with the other side of the shear motor means and with another port of the drive motor means, said other valve operated at its second condition diverting fluid under pressure in said main line upstream through said first line into said one side of the shear motor means forcing fluid from said other side of the shear motor means through said second line to said main line downstream of said other valve to actuate the shear assembly, said other valve operated at its third condition diverting fluid under pressure in said main line upstream through said second line into said other side of the shear motor means forcing fluid from said one side of the shear motor means through said first line to said main line downstream to retract the shear assembly, fluid under pressure in said second line passing through the drive motor means into said first line to said main line downstream to actuate the drive mechanism when the shear assembly is reopened.

6. The hydraulic control circuit of claim 5 further including a check valve disposed in said second line intermediate said other valve and the drive motor means to prevent fluid flow from said first line through the drive motor means into said second line to preclude operation of the drive mechanism when said other valve is operated at the second condition.

7. The hydraulic control circuit of claim 5 further including a speed shear valve operatively connected with said first and second lines to control the operating speed of the shear assembly.

8. The hydraulic control circuit of claim 1 further including a relief valve connected intermediate said source of fluid under pressure and at least one of the hydraulic motor means for diverting fluid under pressure to a reservoir whenever fluid pressure exceeds a predetermined amount.

9. The hydraulic control circuit of claim 1 further including a third control valve disposed along said main line for selectively diverting fluid under pressure from said main line.

10. The hydraulic control circuit of claim 1 wherein said one valve is intermediate said source of fluid under pressure and said other valve, said other valve being intermediate said one valve and said reservoir.

* * * * *